G. L. TRUITT.
RAZOR.
APPLICATION FILED FEB. 18, 1908.
907,424.
Patented Dec. 22, 1908.
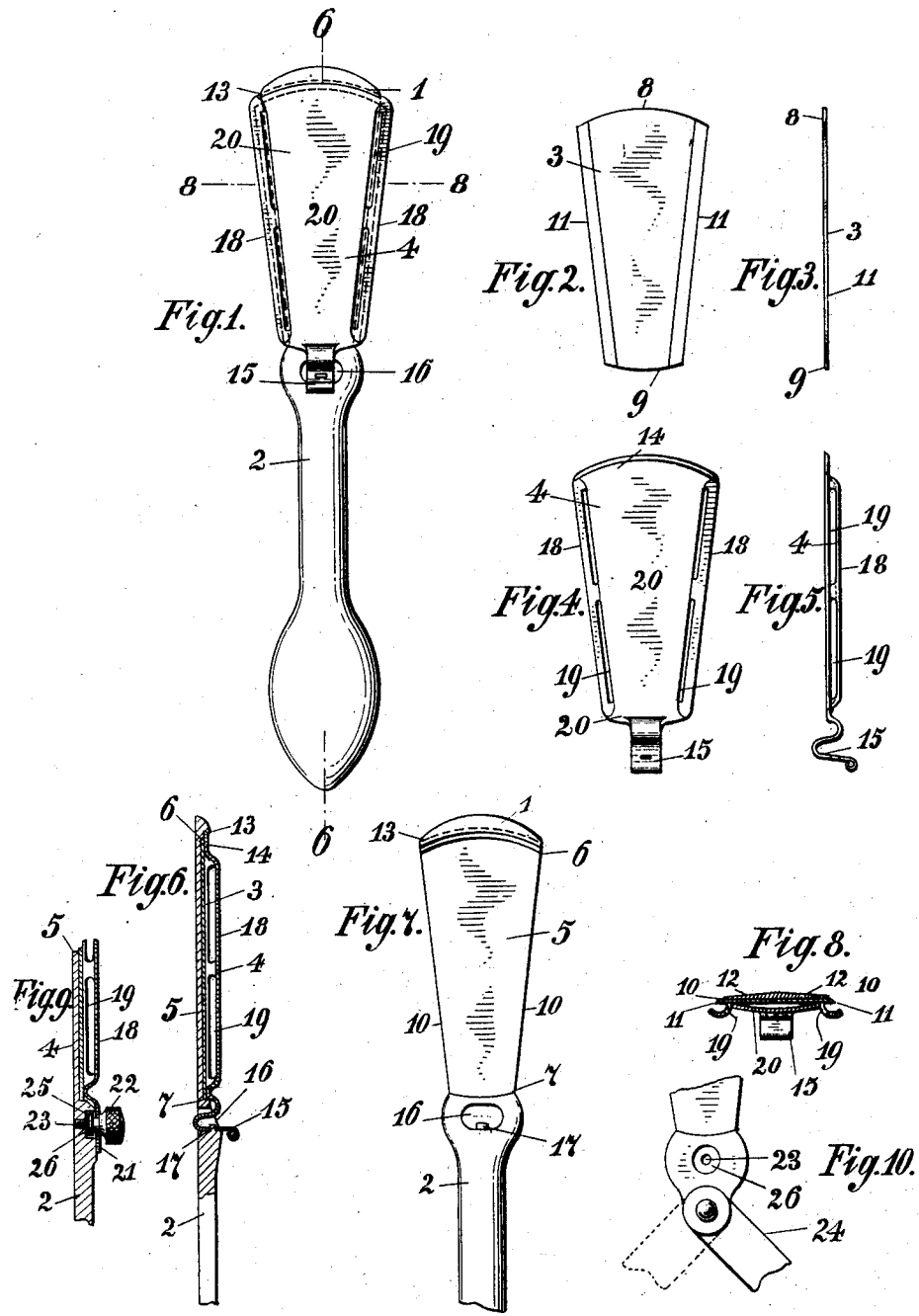
Witnesses
Edward Rooney
W. H. Hutton
Inventor
George L. Truitt
By his Attorney
Pennington Halsted

UNITED STATES PATENT OFFICE.

GEORGE L. TRUITT, OF NEW YORK, N. Y.

RAZOR.

No. 907,424.

Specification of Letters Patent.

Patented Dec. 22, 1908.

Application filed February 18, 1908. Serial No. 416,482.

*To all whom it may concern:*

Be it known that I, GEORGE L. TRUITT, a citizen of the United States, residing in the borough of Manhattan, city of New York, county of New York, and State of New York, have invented new and useful Improvements in Razors, of which the following is a specification.

My invention relates to razors, and especially to that class of razors having a removable blade.

The principal objects of my invention are to provide the simplest means possible for insuring the proper position of the blade relatively to its support, and for holding the blade in said position. Also to provide a razor with a removable blade with as few parts as is practicable, for use either as a safety or ordinary razor, and which parts can be readily detached from each other and put together; and also that will have the least possible places for moisture and lather to collect and settle, and that can be readily washed and dried. Also to provide means whereby during the natural handling of the razor in use, a sliding cut will be given instead of a direct or transverse cut, the sliding cut being more effectual and less likely to pull the beard.

Other objects of my invention are to provide a razor having a removable blade, of great simplicity of construction, of great durability, and of small cost.

My invention consists of the device, parts and elements, and combinations of parts and elements, as hereinafter described, and shown in the drawings.

In the accompanying drawing—Figure 1 illustrates a plan of one embodiment of my invention. Fig. 2 is a plan of one of the blades. Fig. 3 is an edge view of the same. Fig. 4 is a plan of the blade holder and guard. Fig. 5 is an edge view of the same. Fig. 6 is a longitudinal section through the line 6—6 of Fig. 1. Fig. 7 is a plan of the blade support and handle, shown in Fig. 1. Fig. 8 is a transverse section through the line 8—8 of Fig. 1, looking in the direction of the arrows. Fig. 9 is a similar longitudinal section to Fig. 6, but showing a different means for retaining the blade holder and guard. Fig. 10 is a detail showing a handle adjustably connected with the blade support, to enable the two to be moved at any angle relatively to each other.

Similar letters represent like parts in all the figures.

1 is the main portion or blade support of the razor, and which is provided with a handle 2 extending from one end of the support 1.

3 is a removable blade and 4 is a removable holder for holding or clamping the blade to the support 1.

The support 1 is provided with a flat inner surface 5, and an arched shoulder 6 extends transversely from said surface at one end, and another transverse shoulder at the other end, which is also preferably arched as at 7. The blade 3 is about the length of the distance between the shoulders 6 and 7, and arched at its ends 8 and 9 to correspond to the shoulders 6 and 7, and so that the blade 3 will rest on the surface 5 of the support 1, with its ends abutting against the shoulders 6 and 7, and prevented from lateral movement on said support. The side edges 10, 10 of the support 1 are inclined longitudinally, and preferably with the outer end wider than the inner end, as shown. The blade 3 is also preferably wider at one end than the other, so that its edges 11, 11 will be similarly inclined to the edges 10 of the support. The inclined edges of the blade enable a sliding cut instead of straight cut to be more readily and naturally made during the process of shaving, and the greater width of the outer end of the support makes it a little heavier and better balances the device when in use. The outer or under side of the support is also preferably beveled transversely toward its edges 10, 10, as shown at 12, 12, Fig. 8, to constitute sliding surfaces guiding to the blade edges during the operation of the razor. The blade holder 4 bears upon the upper surface of the blade 3, and one end extends under an overhanging flange 13 extending from the shoulder 6. This flange 13 and the corresponding end 14 of the holder 4 are preferably arched, as shown in Figs. 1, 4 and 5, to insure its proper position, and to prevent lateral movement. The end of the holder 4 opposite the arched end 14, is provided with means for removably securing the holder to the support 1 or its handle. In Figs. 4, 5 and 6, this means is shown as a spring latch formed from a bent tongue 15, the bend of which is adapted to enter a socket or hole 16 in the handle 2, and be caught and held therein by a lug 17 in said socket entering a socket or hole in the tongue 15. The outer end of said tongue extends beyond the socket 16, to enable the tongue to be readily and instantly released, and the holder 4 removed.

The holder 4 is provided with outwardly extending side flanges 18, the bends or connections of said flanges corresponding to or parallel with the edges of the blade, but extending not quite to said edges, so that there will be enough of the edges to cut with. The outer edges of the flanges 18 extend beyond the edges of the blade but near enough to the plane of the same to serve as sufficient safety guards during the use of the razor. In order to prevent the collection of soap and lather in the bend of the flanges 18, said bends are slotted at 19, so that the lather will pass through said slots to the back 20 of holder 4. The slots 19 can extend almost the entire length of the flanges 18, it being necessary only to have enough material to prevent a complete separation of the flanges, and to retain them to the holder. In order that the holder 4 be efficient as a clamp or holder of the blade, it need be pressed against the surface 5 of the holder only near its edges. If the main portion of the holder 4 be sprung up, as shown in Fig. 8, the bend of the flanges 18 need only to bear against the blade, and the blade will be tightly held, and more uniformly than if the holder was flat and rested on the surface of the blade.

Instead of a spring latch for securing the blade holder, I may have an ordinary tongue 21 extending from the holder 4, (see Fig. 9) and secure said tongue to the handle or blade support by means of a thumb-screw 22 passing through a hole in said tongue into a screw-threaded socket or hole 23 in said handle or support. To prevent the screw 22 from becoming lost, it is held to the tongue 21 by the head of the screw and a collar 25 on either side of the tongue, said collar resting in an inset or recess 26 of the handle 2 when the screw is in its socket 23.

In order that the blade may assume positions for securing the best results in shaving, the handle such as 24, Fig. 10, may be pivoted to the holder 4, and it is preferable that the joint at this pivot be tight enough to retain the pivoted parts in the positions in which they are turned, until they are turned again.

My invention provides a safety razor of the greatest efficiency and with all the requirements, and with the fewest possible parts. There need be only three parts, viz: the support with handle, the blade, and the clamping holder. The parts can be instantly separated and as quickly assembled; and by reason of the arched shoulders of the support, and the corresponding arched ends of the blades, and when one of the latter is dropped in place with its ends abutting against the arched shoulders of the support, the blade will have taken its proper position, and be prevented from lateral movement relatively to its support. The clamped support can be as readily put into place, by first inserting one end under the overhanging flange, and then pressing down the latch until it is caught. By pressing back said latch, the holder can be immediately lifted from the blade, and the blade can be then lifted away from its support, or allowed to drop from the support, by turning it upside down. The blades can be readily sharpened, but they can be made so cheaply, that it would probably be more satisfactory to replace a blade when it becomes dull, by a new one. The blades have no notches, recesses or angles to catch and collect lather and moisture, and therefore can be instantly cleaned and dried and prevented from rusting. The lather, during the process of shaving with my improved razor, will not accumulate on and near the edge of the blade, and impair its efficiency (as is especially apt to be the case with razors having a rake formed guard), but will pass directly through the long open passages or slots, to the back of the holder, and it will be seen that there are no sockets, recesses or small angles to collect moisture and lather, and to cause rust either on or in the support or the holder, and that every part of the razor is readily accessible, and can be easily cleaned and wiped.

I do not limit myself to the precise construction shown and described, as changes may be made therein without departing from the spirit of my invention.

What I claim as new and desire to secure by Letters Patent, is:

1. A razor comprising a removable blade, a support for said blade having an arched shoulder for one end of the blade to abut against to prevent its lateral displacement, means for removably securing said blade to the support, and a guard to said blade independent of the support.

2. A razor comprising a removable blade, a support for said blade having an arched shoulder for one end of the blade to abut against to prevent its lateral displacement, and a removable guard for clamping said blade to the support.

3. A razor comprising a removable blade, a support for said blade, means for clamping said blade to the support, and having a latch for securing said means to the support, and said means detachable from said support and blade.

4. A razor comprising a removable blade, a support for said blade, means for clamping said blade to the support, and having a spring latch for securing said means to the support, and said means detachable from said support and blade.

5. A razor comprising a removable blade, a support for said blade, removable means for guarding said blade and clamping it to the support, and having a latch for securing said means to the support.

6. A razor comprising a removable blade, a support for said blade having shoulders for each end of the blade to abut against to keep the blade from lateral movement, and also having an overhanging flange, a blade holder having one end adapted to be held by said flange, and means for clamping the holder down on the blade.

7. A razor comprising a removable blade, a support for said blade having shoulders for each end of the blade to abut against to keep the blade from lateral movement, and also having an overhanging arched flange, a blade holder having an arched end adapted to be held by said flange, and means for clamping the holder down on the blade.

8. A razor comprising a removable blade, a support for said blade, a holder for clamping said blade to the support, having a flange at its side, and longitudinally slotted at the bend of the flange, and said bend bearing upon the blade near its cutting edge.

9. A razor comprising a removable blade, a support for said blade, a holder for clamping said blade to the support, having flanges at its opposite sides, and longitudinally slotted at the bends of the flanges, and said bends bearing upon the blades near their cutting edges.

10. A razor comprising a removable blade, a support for said blade, a holder for clamping said blade to the support, having flanges at its opposite sides, and raised or sprung up between the flanges, and longitudinally slotted at the bends of the flanges, and said bends bearing upon the blades near their cutting edges.

11. A razor comprising a removable blade, a support for said blade, a holder for clamping said blade to the support, having a flange at its side, and longitudinally slotted at the bend of the flange, and said flange extending toward the plane of the blade and forming a guard for the edge of the same.

12. A razor comprising a removable blade, a support for said blade, a holder for clamping said blade to the support, having flanges at its opposite sides, and longitudinally slotted at the bends of the flanges, and said flanges extending toward the plane of the blade, and forming guards for the edges of the same.

13. A razor comprising a removable blade, a support for said blade, a holder for clamping said blade to the support, having a flange at its side, and longitudinally slotted at the bend of the flange, said bend bearing upon the blade, and said flange extending toward the plane of the blade and forming a guard for the edge of the same.

14. A razor comprising a removable blade, a support for said blade, a holder for clamping said blade to the support, having flanges at its opposite sides, and longitudinally slotted at the bends of the flanges, said bends bearing upon the blade, and said flanges extending toward the plane of the blade, and forming guards for the edges of the same.

In testimony whereof, I have signed my name to this specification, in the presence of two subscribing witnesses.

GEORGE L. TRUITT.

Witnesses:
  LOUIS H. WAGNER,
  EDWARD ROONEY.